3,582,502
METHOD OF REINFORCING LATEX FOAM
James E. Farrow, Brookfield, and Peter H. Vossos, Berwyn, Ill., assignors to Nalco Chemical Company, Chicago, Ill.
No Drawing. Filed Dec. 6, 1968, Ser. No. 781,981
Int. Cl. C08d *13/08;* C08f *47/08*
U.S. Cl. 260—2.5L   4 Claims

ABSTRACT OF THE DISCLOSURE

The compression resistance of open cell foam rubber is improved by treating the finished foam rubber with an aqueous metal-free solution of active silica, whose particle size does not exceed 5 m$\mu$.

INTRODUCTION

The present invention is directed to improvements in the processes and compositions of the type described in Talalay, et al., U.S. 2,926,390. This patent teaches the use of certain aqueous colloidal silica sols for improving the compression resistance of foam rubber by treating such rubber with aqueous baths which contain dispersed particles of colloidal silica.

Typical of the colloidal aqueous silica sols used in the practice of Talalay, et al., U.S. 2,926,390 are those aqueous colloidal silica sols described in Bechtold, et al., U.S. 2,574,902. The sols produced in accordance with Bechtold, et al., U.S. 2,574,902 may be characterized as having particle size diameters within the range of 10–130 m$\mu$ and containing relatively substantial amounts of alkali metal oxides, such as sodium oxide.

Sols of the type disclosed in the Bechtold, et al., U.S. 2,574,902 patent are prepared by first alkalizing the effluent resulting from contacting a dilute alkali metal silicate solution with a hydrogen-form cation exchange resin. A portion of such alkalized effluent is then heated and additional effluent added thereto under conditions of constant volume of evaporation until a finished silica sol is produced which contains 20–35% by weight SiO$_2$. As indicated, these sols are used in the practices of Talalay, et al., U.S. 2,926,390 to treat latex foam rubber whereby its compression resistance is substantially improved.

While this process is now used commercially by the foam rubber art, it has several disadvantages. In the first instance, it is necessary to utilize relatively expensive silica sols produced in accordance with the Bechtold, et al., U.S. 2,574,902 process.

Another disadvantage arising from the utilization of Bechtold, et al., U.S. 2,574,902 sols in the treating of latex foam rubber is the fact that the alkali metal cations present in such sols are considered undesirable. The alkali metal cations tend to have an adverse effect on the finished foam latex article which causes it to prematurely deteriorate under normal conditions of use. To overcome this adverse effect of sodium problem it is possible to use deionized silica sols of the Bechtold U.S. 2,574,902 by using the process described in Mindick U.S. 3,342,747. However, such sols are relatively expensive, thereby limiting the use from cost standpoint.

While the compression resistance is improved by using silica sols of the type described in Bechtold, et al., U.S. 2,574,902 even greater compression resistance, if available, would be of benefit to the art.

Of further benefit to the art would be the availability of a treating material for foam rubber latices which could impart thereto a superior degree of compression resistance yet at the same time be inexpensive and work at extremely low dosages.

OBJECTS OF THE INVENTION

Based on the above, it, therefore, becomes an object of the invention to provide a treating agent for latex foam rubber which will impart thereto a high degree of compression resistance.

A specific object of the invention is to provide a colloidal silica-type treating agent for foam rubber which will work at low economical dosages and yet will impart improved compression resistance thereto.

Another object of the invention is to provide a sponge rubber having improved compression resistance which contains uniformly distributed therethroughout silica which is an extremely fine state of sub-division.

THE INVENTION

In accordance with the invention it has been found that open cell foam rubber may be treated with certain aqueous suspension of silica whereby its compression resistance is substantially improved. The silica suspensions used to impart this compression resistance to foam rubber comprise aqueous metal-free solutions of active silica whose particle size does not exceed 5 m$\mu$.

THE METAL-FREE SOLUTIONS OF ACTIVE SILICA

The term "active silica" as used herein and in the claims is defined in Rule, U.S. 2,577,484 as follows:

"any silica in molecular or colloidal aqueous solution, in such a state of polymerization that when diluted with sodium hydroxide solution to a pH of 12, and concentration of about 0.02 percent SiO$_2$, at 30° C. the silica will be depolymerized substantially completely to monomer in not more than 100 minutes."

For purposes of utilization in this invention these active silica are further characterized as having an average particle size of less than 5 m$\mu$, and preferably less than 1–3 m$\mu$. They are considered as being "metal free" in that a 5% SiO$_2$ sol does not contain more than 0.01% by weight of alkali ions, expressed as Na$_2$O.

When colloidal silica has particle sizes within the ranges thus described, much of the silica may be considered as being in solution rather than in a state of colloidal sub-division. Thus the silica suspensions most useful in the practices of this invention may be characterized as low molecular weight species of polysilicic acid at least 20% of which whose molecular weight does not exceed 2,000.

The pH of the suspend silicas generally are within the range of from 1.5 to 4 and preferably 2.5 to 3. Products of this type are readily prepared by the decationization of dilute alkali-metal silicate solution by contacting such solutions with a hydrogen-form cation exchange resin. These products form a preferred class of materials for use in the practice of the invention.

Products produced by this technique are well-known and typically have the characteristics set forth below in Table I.

Table I

| | |
|---|---|
| Colloidal silicas, as SiO$_2$, percent | 2–10 |
| pH | 1.5 to 4 |
| Conductance in micromhos | <700 |
| Average particle size, m$\mu$ | 1–3 |
| Specific gravity at 68° F. | <1.06 |
| Viscosity at 77° F. cps. | <5 |
| Na$_2$O percent | <.005 |

The techniques of producing silica suspensions of the above type are well-known. See, for example, Bird, U.S. 2,244,325.

A preferred commercial method of making acid sols of the type listed in Table I are set forth in Klosack, Canadian Pat. 726,149.

This patent teaches a commercially feasible method for making polysilicic acids which are stabile for several days to a few weeks and which are produced at relatively high silica concentrations.

A typical preparative technique for making products described in Canadian Pat. 726,149 is set forth in Example I below:

EXAMPLE I

A 37% sodium silicate solution was diluted with soft water to a 6.8% sodium silicate solution, which when expressed in terms of silica solids content contained approximately 5.2% $SiO_2$. This solution was then fed to an hydrogen form exchanger containing 160 cubic feet of "Nalcite HCR" cation exchange resin, at a feed rate through the exchanger of 9 gallons per square foot. The "sweeten-on" step was run for approximately two and ½ minutes, this portion of sol effluent being discarded. The exchanger effluent was then directed to a storage tank. The above service run was automatically terminated when the conductivity of the acid sol effluent decreased from 500 mmhos to 300 mmhos. A composite sample from the collected effluent contained silica in a concentration of 4.8% measured as $SiO_2$ and had a pH of 3.0.

The above service step through the exchanger was then followed by a "sweeten-off" step which lasted approximately 15 minutes. During this step, in order to later utilize unreacted sodium silicate, soft water was fed to the exchanger at a rate of 170 gallons per minute. This effluent was collected for reuse in the next cycle.

The backwashing step was then run by flowing city water through the exchanger in a reverse flow to the sodium silicate flow at a rate of 160 gallons per minute. This step was terminated when the exchanger effluent had an alkalinity of 15 grains per gallon measured as $CaCO_3$.

The resin regeneration step was begun by flow through the resin bed with a 5% sulfuric acid solution. This was continued until a regenerant level of 7.5 pounds of acid per cubic foot of resin was attained. The exchanger was first rinsed for 10–12 minutes with soft water at a rate of 70 gallons per minute until the acid was displaced. Lastly, the exchanger was again rinsed at 170 gallons per minute for 20 minutes. This step was terminated when the exchanger effluent had an acidity of 10 grains per gallon measured as $CaCO_3$. The above outlined cycle was then continuously repeated.

In addition to silica suspensions of the type described above, it is possible to use deionized sols of the type described in Rule, U.S. 2,577,484.

Treatment of the latex foam rubber is accomplished by utilizing as treating baths silica suspensions of the type described above, whose silica concentration, expressed as $SiO_2$, is within the range of 0.1–10% by weight and, most preferably, is within the range of 0.5–6% by weight. Frequently silica suspensions directly produced by the ion exchange techniques described may be used directly as produced. This allows a product to be directly produced without further expensive concentration steps being used.

TREATMENT OF THE LATEX FOAM RUBBER

As described in Talalay, et al. U.S. 2,926,390, it is possible to treat a variety of open cell foam rubber articles with colloidal silica whereby improved compression resistance is achieved. To illustrate the typical processing steps for making rubber foamed latices and the types of latices that may be treated with colloidal silicas, the following portion of Talalay, et al., U.S. 2,926,390 is presented:

"The latex is compounded in the usual manner with materials normally added to the latex to form a latex composition suitable for making foam rubber. The latex may be natural rubber latex (which essentially is an aqueous dispersion of a polymer of isoprene), or a synthetic rubber latex, such as an aqueous dispersion of a rubbery polymer of an open-chain conjugated diolefin having from four to eight carbon atoms exemplified by butadiene-1,3; 1,4-dimethyl butadiene-1,3; 2,3-dimethyl butadiene-1,3, and the like, or of rubbery co-polymers of such diolefins and similar conjugated diolefins with each other or with copolymerizable monomeric materials containing a single ethylenic linkage exemplified by styrene, methyl acrylate, methyl methacrylate, ethyl acrylate, ethyl methacrylate, acrylonitrile, or similar materials, or of rubbery polymers of chloroprene and the like, or a blend of a natural latex with a synthetic latex or a blend of synthetic latices."

"The compounded latex is frothed or foamed for example, by mechanically entraining a non-coagulating gas such as air or nitrogen in the latex until the volume of the froth is sufficient to form a foam rubber of a desired density or by adding to the latex a gas-liberating material which decomposes in the latex or chemically reacts with another material in the latex, and the frothed or foamed latex is congealed or coagulated. Gelation of the frothed latex can be accomplished by adding a delayed action coagulant such as sodium silicofluoride, potassium silicofluoride, ammonium chloride or ammonium chloride or ammonium nitrate to the latex which causes the latex to gel within a relatively short and predeterminable time after it has been added to the latex, or by freezing the frothed or foamed latex and forcing a liquid or gas coagulant through the frozen latex as described in U.S. Pat. 2,432,353. The congealed cellular mass is vulcanized in the usual manner, for example, by heating the coagulated latex in a mold or hot air oven at a vulcanizing temperature until the desired vulcanization is obtained. (It is apparent that in the manufacture of foam rubber by the process of this invention the steps of the process through the steps of vulcanizing the coagulated cellular latex mass are the same as those normally employed heretofore in making foam rubber.)"

"After vulcanization the foam rubber preferably is washed with water to remove water-soluble materials, such as soap, from the foam rubber before the foam rubber is treated with the aqueous colloidal silica dispersion. If the foam rubber has been coagulated by freezing the frothed latex and forcing a liquid or gas coagulant through the frozen latex as described in U.S. Pat. 2,432,-353, the foam rubber need not be dried before it is treated with the aqueous colloidal silica dispersion, but if gelation of the frothed latex is accomplished by using a delayed action coagulant, such as sodium silicofluoride the vulcanized foam rubber should be dried in the usual manner before attempting treatment of the foam rubber with the aqueous colloidal silica dispersion."

The silica treating materials as used in this invention may be applied to the foam rubber by means of either immersing the foam rubber article in a bath or as a spray with the former method representing a preferred method of incorporating the silica into the foam.

The amount of silica incorporated into the foamed rubber latex will vary depending upon process conditions. As a general rule, the finished dried latex will contain as little as 0.01% by weight of silica up to as much as about 10% by weight. In most cases good results are achieved when the quantity of silica distributed throughout the foamed rubber varies between 1%–3% by weight.

EVALUATION OF THE INVENTION

To illustrate the advantages of the invention, commercial foamed rubber latex specimens having the dimensions 8" x 10" x 4" were used. These specimens were immersed in a variety of silica treating baths for several minutes to penetrate the foam. While immersed in the bath samples were subjected to moderate hand pressure. Excess liquid was squeezed from the samples by passing through washing machine wringer rollers spaced ½″ apart.

The samples were dried for 4 hours at 250° F.

The various silica treating baths used in the above described experiments contained from 2–3% $SiO_2$ by cwt. These baths were prepared by diluting the various silica sols described in Table II.

TABLE II

| | Sol I | Sol II | Sol III | Sol IV |
|---|---|---|---|---|
| Percent $SiO_2$ | 5.8 | 30 | 15 | 15–20 |
| pH | 3.0 | 10.0 | 9.94 | 4.15 |
| Particle size, m$\mu$ | 1–3 | 8 | 4 | 8 |
| Gravity, 68° F | 1.03–1.05 | 1.214 | 1.102 | 1.097 |
| $Na_2O$ | <.005 | 0.65 | 0.6 | <0.01 |

The results of treating the foamed latices with the above aqueous dispersions of colloidal silica are set forth in Table III below:

TABLE III

| Sol No.: | Percent $SiO_2$ pick-up | Modulus at— 25% compression, lbs. | 50% compression, lbs. |
|---|---|---|---|
| I | 2.0 | 45 | 72 |
| I | 2.3 | 50 | 83 |
| II | 2.1 | 36 | 58 |
| III | 1.9 | 39 | 59 |
| IV | 2.2 | 35 | 55 |

It is evident from Table IIII above that the silica-treating baths used in the practice of the invention give better compression resistance than the other commercially available silicas tested. Thus the invention has provided an improved method for treating foam rubber latices to improved compression resistance.

What is claimed is:

1. In a process for making an open cell foam rubber comprising the steps of foaming a latex, congealing the foamed latex, vulcanizing the congealed cellular mass to form an open cell foam rubber, and then impregnating the vulcanized foam rubber with an aqueous dispersion of colloidal silica, the improvement which comprises using as the aqueous dipersion of colloidal silica a metallic sodium-free aqueous solution of active silica whose particle size does not exceed 5 m$\mu$.

2. The process of claim 1 where the sodium-free solution of active silica has the following characteristics:

| | |
|---|---|
| Percent colloidal silicas, as $SiO_2$ | 2–10 |
| pH | 1.5 to 4 |
| Conductance in micromohs | <700 |
| Average particle size, m$\mu$ | 1–3 |
| Specific gravity at 69° F. | <1.06 |
| $Na_2O$ percent | <.005 |

3. An open cell foam rubber article produced according to claim 1 containing uniformly dispersed there throughout from 0.01–10% by weight of finely divided particles of silica whose average particle size does not exceed 5 m$\mu$.

4. An open cell foam rubber article produced according to claim 2 containing uniformly dispersed there throughout from 0.01–10% by weight of finely divided particles of silica whose average particle size does not exceed 5 m$\mu$.

References Cited

UNITED STATES PATENTS

| 2,926,390 | 3/1960 | Talalay et al. | 260—2.5L |
| 3,081,154 | 3/1963 | Acker et al. | 23—182 |

FOREIGN PATENTS

| 726,149 | 1/1966 | Canada | 252—317 |

MURRAY TILLMAN, Primary Examiner

W. J. BRIGGS, Sr., Assistant Examiner

U.S. Cl. X.R.

117—98, 169A; 260—41.5A, 723; 264—50